(12) United States Patent
Lammers

(10) Patent No.: US 6,593,780 B2
(45) Date of Patent: Jul. 15, 2003

(54) CIRCUIT FOR SELECTIVELY GENERATING AN OUTPUT SIGNAL FROM ONE OR MORE CLOCK SIGNALS

(75) Inventor: Christoph Lammers, Hamburg (DE)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 10/142,620

(22) Filed: May 9, 2002

(65) Prior Publication Data
US 2002/0186065 A1 Dec. 12, 2002

(30) Foreign Application Priority Data
May 9, 2001 (DE) .......................... 101 22 481

(51) Int. Cl.$^7$ ............................................. H03K 17/00
(52) U.S. Cl. ..................... 327/99; 327/294; 327/298; 327/407
(58) Field of Search .................. 327/291, 293, 327/294, 295, 296, 297, 298, 407, 99, 165, 166; 326/46; 331/49

(56) References Cited

U.S. PATENT DOCUMENTS

| | | | | |
|---|---|---|---|---|
| 4,970,418 A | * | 11/1990 | Masterson | .................. 327/141 |
| 5,155,380 A | * | 10/1992 | Hwang et al. | ................. 327/99 |
| 5,389,838 A | * | 2/1995 | Orengo | .......................... 326/93 |
| 5,483,185 A | | 1/1996 | Scriber et al. | ................. 327/99 |
| 5,604,452 A | | 2/1997 | Huang | ........................... 327/99 |
| 5,790,609 A | | 8/1998 | Swoboda | ..................... 375/357 |
| 6,452,426 B1 | * | 9/2002 | Tamarapalli et al. | .......... 327/99 |
| 6,453,425 B1 | * | 9/2002 | Hede et al. | .................. 713/501 |

* cited by examiner

Primary Examiner—Timothy P. Callahan
Assistant Examiner—Hai L. Nguyen
(74) Attorney, Agent, or Firm—Stecen J. Biren

(57) ABSTRACT

The invention relates to a circuit (100) with which one of a plurality of input clock signals (CLK_SRC1, . . . , CLK_SCR_n) can be selected and passed on to an output signal (CLK_OUT). The input clock signals are present at a multiplexer (MUX) which applies one of these signals in dependence upon the selection signal (CFG_i) from its control input to its output. The output signal (MUX_OUT) of the multiplexer is applied via a switch (S) and a signal latch (LATCH) to the output of the circuit as output signal (CLK_OUT). Switching between two input signals is controlled by a state machine (FSM) which first intransparently switches the signal latch (LATCH) after a change of the external configuration signal (CFG), then switches the multiplexer (MUX) and transparently switches the signal latch again after the multiplexer output (MUX_OUT) has changed at least once and assumed the value stored in the signal latch. The state machine (FSM) is supplied with its own fast clock (FCLK).

4 Claims, 2 Drawing Sheets

006# CIRCUIT FOR SELECTIVELY GENERATING AN OUTPUT SIGNAL FROM ONE OR MORE CLOCK SIGNALS

BACKGROUND OF THE INVENTION

The invention relates to a circuit for selectively generating an output signal from one or more clock signals.

Digital microelectronic circuits require clock signals for their operation, which signals predetermine the clock rates. Under circumstances, the situation may occur that the logic circuit is to be alternately operated at different clock rates which are derived from different clock signals. For example, it may be necessary to be able to operate the central processor (CPU) of a microcomputer optionally with a fast and a slow clock in order that it can adapt to slower peripheral apparatus, if any. Also in smart card controllers, the sources for the chip clock may be different dependent on their application. For example, an external clock may be supplied via a pin of the smart card or it may serve as an internal source for an on-chip oscillator.

When switching between different system clocks, it is to be taken into account that no undefined states or voltage pulses (glitches) occur during switching. Circuits allowing a switch-over between a plurality of clock signals or between two different clock signals under these circumstances are described in, for example, U.S. Pat. Nos. 5,483,185, 5,604,452 and 5,790,609. In the known circuits, the predetermined clock signals are applied to a multiplexer whose output supplies one of the clock signals, which can be selected via a control input of the multiplexer, as an output signal. The switch-over between two clock signals is controlled by a control means in such a way that no undefined signal states can occur at the output. To this end, the output signal is maintained during a switching process at a level which corresponds to a logic high state. Starting from this state, the output signal subsequently proceeds at the newly selected clock. However, by waiting for a high state, a proportionally long period of time is lost in the switching process when the output signal is just in a logic low state at the start of the switching process. In the case of frequent switching processes, noticeable delays may therefore occur in the circuit. Moreover, known circuits have in common that the control therein is performed by one of the external clock signals. When this clock signal is disturbed or stopped, the function of the circuit will be interrupted.

SUMMARY OF THE INVENTION

Based on this recognition, it is an object of the invention to provide a circuit for selectively generating an output signal from a plurality of input clock signals, allowing a fast and interference-free switching between the clock signals. Simultaneously, the circuit should be failsafe and preferably realized in a CMOS technique by simple means.

This object is solved by a circuit as defined in claim 1. Advantageous embodiments are defined in the dependent claims.

The circuit for selectively generating an output signal from one or more input clock signals comprises the following elements:

A) a multiplexer having a plurality of inputs for the input clock signals, a control input for selecting one of the input clock signals, and a multiplexer output for supplying the selected input clock signal;

B) a signal latch arranged between the multiplexer output and the output of the circuit, in which the connection line to the multiplexer output comprises a switch;

C) a switching logic with a control input for an external clock selection signal, signal inputs for the signal of the multiplexer output and the output signal of the circuit, a clock input for a logic clock signal, and a control output which is connected to the control input of the multiplexer, and a disable signal output which is connected to the switch.

The switching logic is adapted in such a way that it opens the switch when the signal at its control input changes, subsequently passes on the changed signal from its control input to its control output and thereby to the multiplexer, and closes the switch again when the output signal at the multiplexer output has changed at least once since the switch was opened, and is equal to the output signal of the circuit stored in the signal latch.

The circuit described allows selective switching of one of the input clock signals to the output signal, in which no undefined states or interference voltages occur in the output signal during switching between two different input clock signals. This is achieved in that the multiplexer output is connected to the output of the circuit via a signal latch and that the connection between the multiplexer and the signal latch can be interrupted by a switch. Such an interruption is performed prior to switching between two input clock signals so that, during switching, the output of the circuit is only connected to the signal latch and, consequently, maintains the current signal level (high or low) constant and free from interference. Only when the switching process is ended and a stable signal, whose level corresponds to the level of the signal in the signal latch, is present at the multiplexer output, the switch is closed again so that the output signal now follows the newly selected input clock signal.

During switching, the circuit ascertains that the level of the output signal present at the start of the switching process is maintained for at least the shortest clock period occurring among the input clock signals. In this way, interference of the connected logic circuit by a clock signal which is too short is excluded. Said effect is achieved in that the control first waits for at least a switch of the signal at the multiplexer output before it closes the switch again and thereby connects the multiplexer output to the signal latch again. It is thus ensured that the current latch state lasts at least one full clock length of the new signal.

The proposed circuit preferably comprises at least a clock generator which is coupled to the clock input of the switching logic so as to make a logic clock signal available. Because of its own clock generator, the circuit will be independent of the external clock signals so that it can also continue to operate in the case of failure or interference. Furthermore, its own clock can ensure that the switching logic operates quickly enough to react substantially without delay to the input clock signals.

The switching logic of the proposed circuit may particularly be constituted as a state machine whose states and state transitions are implemented in such a way that it performs the following steps:

a) waiting for a change of the clock selection signal at the control input;

b) supplying a disable signal at the disable signal output for opening the switch when the clock selection signal at the control input has changed;

c) passing on the clock selection signal from the control input to the control output which leads to the control input of the multiplexer;

d) waiting for a change of the signal at the multiplexer output;

e) if the changed signal at the multiplexer output is not equal to the output signal of the circuit, waiting again for a change of the signal at the multiplexer output;

f) eliminating the disable signal at the disable signal output so as to close the switch, and returning to step a).

Such a state machine has the advantage that its function can be defined in standardized circuit description languages which allow a simple and automatic conversion of the function predetermined in logic steps in a concrete circuit.

The circuit according to the invention is preferably realized in a CMOS technique. This is a known and reliable technique which allows integration of the circuit on conventional microchips. Particularly, the circuit may be used in connection with a smart card chip. In smart cards, the situation often occurs that the chip is to be optionally controlled with an externally supplied or internally generated clock and that the security requirements imposed on the function of a smart card are very stringent. The occurrence of an undefined signal state in the output signal or even a reset of the chip during a switching process are to be avoided in any case.

DETAILED DESCRIPTION

Figure 1:
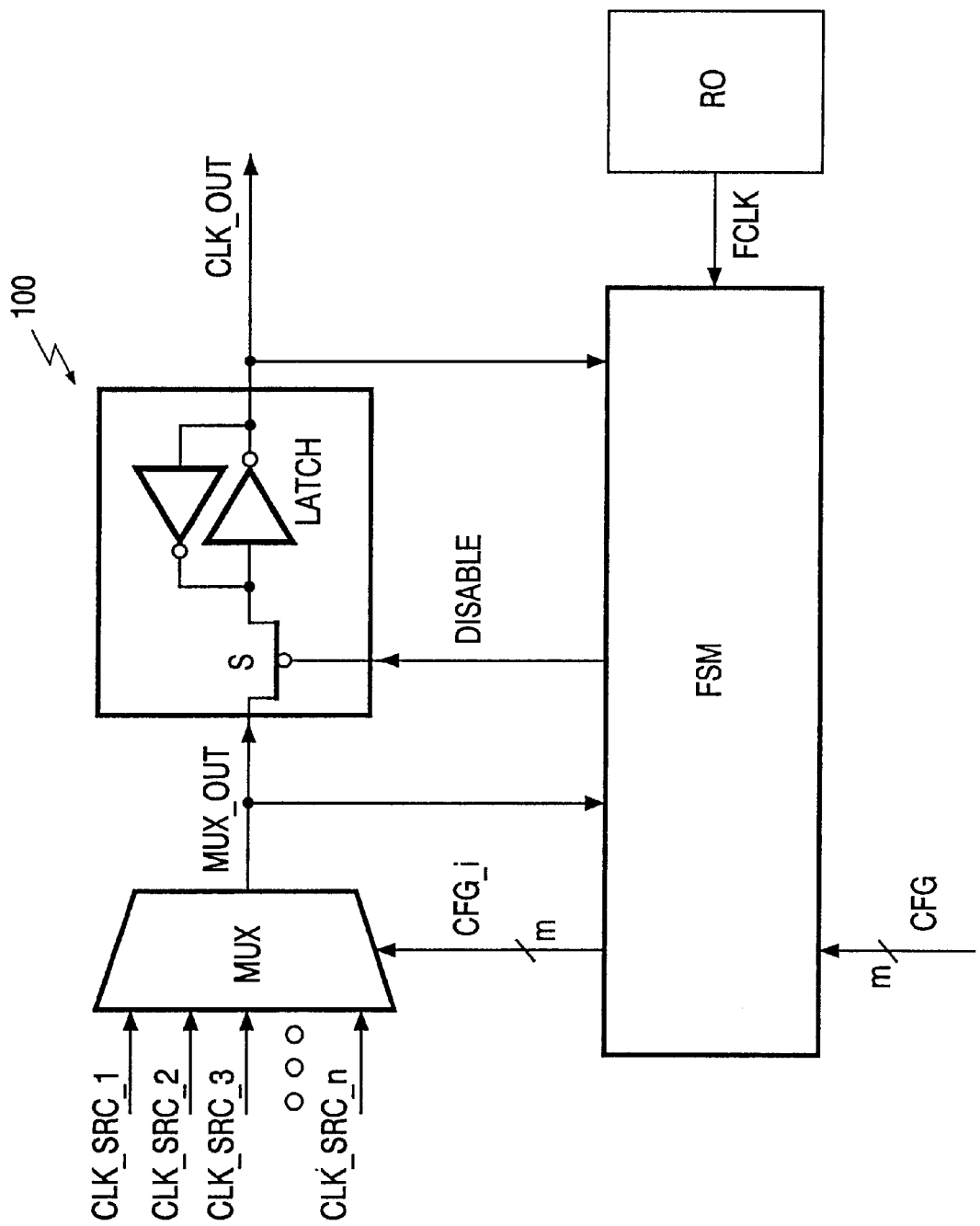
FIG. 1 shows the circuit diagrammatically.

FIG. 1 shows a circuit 100 which allows generation of an output signal CLK_OUT by selecting an input clock signal from a plurality of predetermined input clock signals CLK_SRC_1, CLK_SRC_2 . . . , CLK_SRC_n. Such a circuit may be particularly used in a smart card chip so as to optionally supply the chip with an external or an internal clock. The input clock signals need not necessarily be synchronized.

For a smart card controller, very stringent security requirements are to be taken into account. In the operative situation, such a smart card controller must never be in an undefined state. It is therefore necessary that the pulses generated as system clock CLK_OUT do not fall short of a system-dependent minimal period so as to always maintain the smart card controller in a defined state. Particularly, short lasting pulses (glitches) must not occur on the system clock.

The switching phase between two input clock signals is therefore critical. A reset of the smart card controller during or after the switching process, which might bring the smart card controller to a defined state again, must not be performed for reasons of maintaining data. Moreover, it is important, particularly for test purposes, that the system clock is derived from the input clock signals in a possibly undistorted manner.

The different input clock signals CLK_SRC_1, . . . , CLK_SRC_n, from which the system clock is to be generated, are present at the inputs of the circuit of FIG. 1. A further input of the circuit is used for supplying a configuration or clock selection signal CFG indicating the input clock signal from which the system clock is to be generated. The signal CFG is a signal vector, i.e. dependent on the number n of the input clock signals, CFG consists of m individual signals in which the relation $2^m$ is larger than/equal to n. The circuit 100 supplies the desired system clock CLK_OUT at its output.

In the circuit 100, the input clock signals CLK_SRC_1, . . . , CLK_SRC_n are connected to the inputs of a conventional multiplexer MUX. The multiplexer MUX has a control input which is connected to a control output of a state machine FSM. Via this control input, the multiplexer MUX receives the internal control signal CFG_i from the state machine, which control signal controls the selection from the input clock signals. CFG_i is a signal vector, similarly as CFG.

The output of the multiplexer MUX conveys the signal MUX_OUT which corresponds to the currently selected input clock signal. This signal is applied to a static CMOS latch via a transistor switch S. The latch serves as a signal memory which maintains the current level (low or high) also when the switch S should be open. The output of the CMOS latch is connected to the output of the circuit and to the state machine FSM. The desired output signal CLK_OUT can be taken from the output of the circuit.

The state machine FSM is connected to the above-mentioned input of the circuit, at which the configuration signal CFG is present. Furthermore, it is connected via a disable signal output to the switch S for optionally opening and closing this switch via the disable signal DISABLE. It receives the signal MUX_OUT as input signals from the multiplexer output, as well as the output signal CLK_OUT.

Furthermore, the state machine FSM is connected to a ring oscillator RO via which it is supplied with its own clock FCLK. This clock clearly exceeds the clock rate of the fastest input clock signal or system clock in order that the state machine FSM performs the required processing steps during the clock periods of the input clock signals and can quasi-instantaneously react to a change of the input clock signals.

When a switch to a different input clock signal for the system clock is to be performed with the circuit 100, this is indicated by a corresponding change of the external configuration signal CFG. After such a change of the configuration signal, the signal latch LATCH is first intransparently switched via the switch S by the state machine FSM and by means of a control signal DISABLE. As a result, the system clock CLK_OUT is maintained at the instantaneously current level. When the signal latch LATCH is reliably intransparent, the state machine passes on the change of the signal CFG as signal CFG_i to the control input of the multiplexer MUX. Consequently, the multiplexer MUX is set at a new input clock signal. Glitches which may occur during this switch in the output signal MUX_OUT of the multiplexer are blocked by the intransparent signal latch LATCH.

The signal latch LATCH is again transparently switched by the state machine FSM at the instant when the output signal of the multiplexer MUX_OUT is stable and has changed to the value stored in the signal latch LATCH. This condition for releasing the signal latch ensures that falling short of the minimum phase length for the system clock in the output signal CLK_OUT does not take place.

The circuit 100 can be described in conventional hardware description languages such as VHDL (IEEE Standard 1076-1987) and can be synthesized under minimal conditions imposed on the required cell library. Principally, only a NAND gate or a NOR gate as well as a static latch for switching synthesis must be provided.

The advantages which can be achieved with the circuit are particularly the possibility of switching between the different input clock signals without generating glitches on the system clock CLK_OUT. This switching may be performed by the controller in the current program run, while a RESET of the controller during or after the switching process is not required. Outside the switching process, only the delay times through the multiplexer MUX and the signal latch LATCH influence the derivation of the system clock by the input clock signal.

Furthermore, it is advantageous that, upon initiation of a switching process, the current system clock CLK_OUT is maintained at the current logic level. It is not necessary to first wait until the level has changed to a given value, for example, to a high level. The switching process therefore proceeds tendentially faster than in known circuits, which particularly applies when switching takes place from a slow to a fast input clock signal. A principal advantage is that the circuit can be configured, i.e. it can be fundamentally extended to an arbitrary number of input clock signals.

A further advantage is that the circuit is pin-compatible with a conventional multiplexer, i.e. no additional input or output signals are required or generated.

A further advantage is that the circuit is controlled by its own separate clock generator RO. It is therefore independent of the quality of the input clock signals and particularly also functions when one of these signals is disturbed or stopped.

Figure 2:
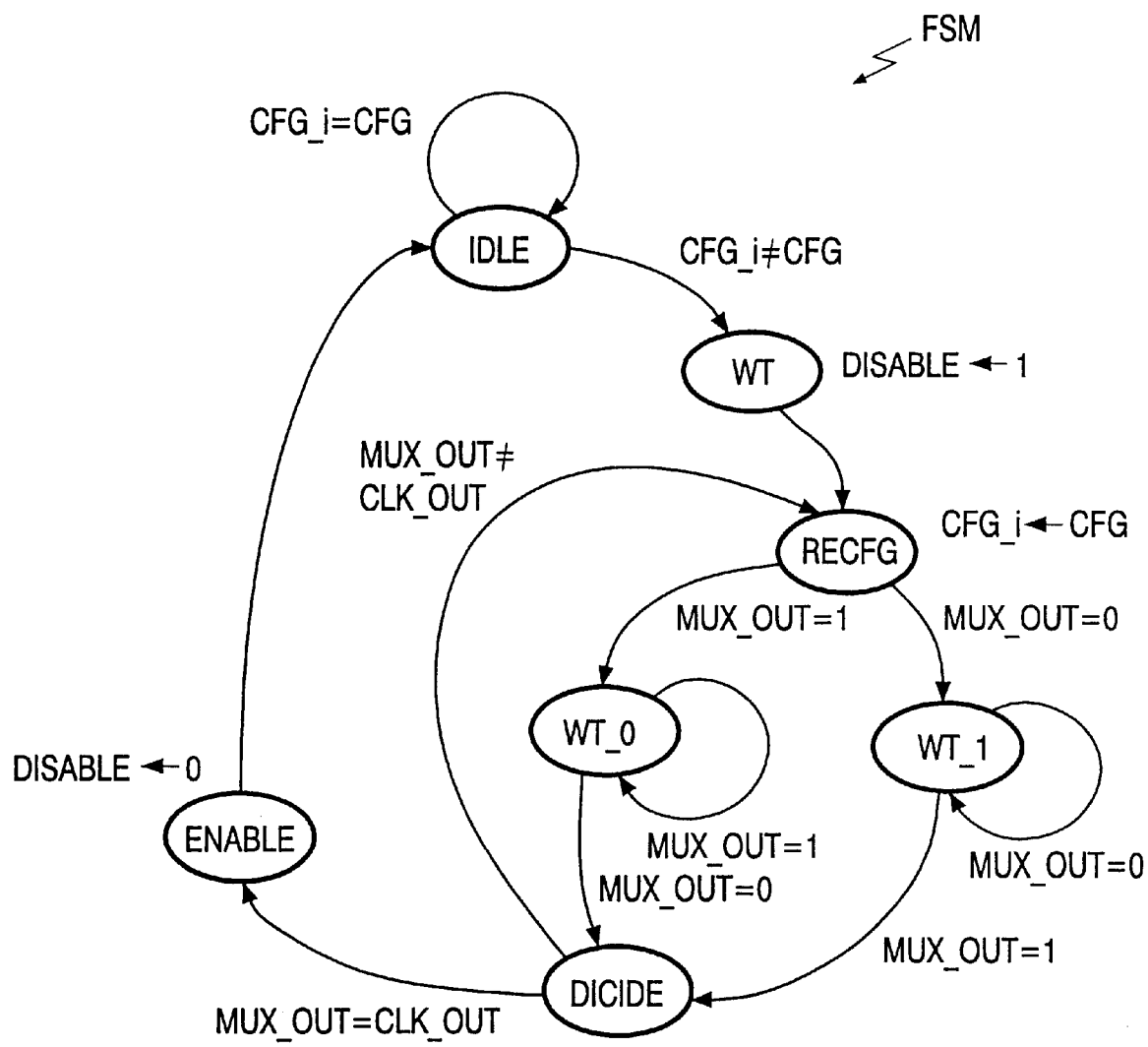
FIG. 2 is a state transition diagram for the switching logic of the circuit of FIG. 1.

FIG. 2 is a state transition diagram of a possible mode of operation of the state machine FSM shown in FIG. 1.

The state machine is usually in the idle state IDLE. The state machine remains in this state as long as the external configuration signal CFG does not change and, consequently, the multiplexer MUX is not switched. The state machine checks whether the external configuration signal remains the same by comparing this signal with the signal CFG_i at the control output of the state machine.

When the multiplexer MUX is to be switched, said signals CFG and CFG_i become unequal. The state machine then changes to the state WT. In this state, the signal DISABLE becomes active, which opens the switch S and thereby intransparently switches the signal latch LATCH.

The state machine subsequently changes unconditionally to the state RECFG. The external configuration signal CFG on the signal CFG_i is first passed on to the multiplexer MUX. The multiplexer MUX thereupon switches to the newly selected input clock signal.

Dependent on the logic level (0 or 1) of the signal MUX_OUT at the multiplexer output, the state machine subsequently changes to the state WT_0 or WT_1 and waits for a change of this signal to the relevant other level. After such a change, the state machine changes to the state DECIDE.

In the state DECIDE, the state machine checks whether the new level MUX_OUT at the multiplexer output corresponds to the level CLK_OUT in the signal latch LATCH. When said levels do not correspond, the multiplexer output cannot be connected yet to the output of the circuit. The state machine therefore changes back to RECFG and starts a new period of waiting for a change of the signal MUX_OUT.

After this second change at the latest, the level MUX_OUT then corresponds to the level CLK_OUT in the latch. When this condition is established in the state DECIDE, the state machine changes to the state ENABLE. In this state, the switch S is closed and the signal latch LATCH is thereby switched transparently again. The signal MUX_OUT of the multiplexer output is thereby passed on to the output of the circuit.

Subsequently, the state machine FSM changes back to the state IDLE again, and the whole process of switching the clock signal is finished.

Reference signs:

| | |
|---|---|
| 100 | circuit |
| CFG | external configuration signal |
| CFG_i | internal configuration signal |
| CLK_OUT | output signal |
| CLK_SRC_1, CLK_SRC_2, . . ., CLK_SRC_n | input clock signals |
| DISABLE | control signal |
| FCLK | logic clock signal |
| FSM | state machine |
| LATCH | signal latch |
| MUX | multiplexer |
| MUX_OUT | multiplexer output signal |
| RO | ring oscillator |

What is claimed is:

1. A circuit for selectively generating an output signal (CLK_OUT) from one or more input clock signals (CLK_SRC1, . . . , CLK_SRC_n), the circuit comprising:
   A) a multiplexer (MUX) having a plurality of inputs for the input clock signals, a control input for a signal (CFG_i) for selecting one of the input clock signals, and a multiplexer output for supplying the selected input clock signal (MUX_OUT);
   B) a signal latch (LATCH) arranged between the multiplexer output and the output of the circuit, in which the connection line to the multiplexer output comprises a switch (S);
   C) a switching logic (FSM) with a control input for an external clock selection signal (CFG), signal inputs for the signal (MUX_OUT) of the multiplexer output and the output signal (CLK_OUT) of the circuit, a clock input for a logic clock signal (FCLK), and a control output which is connected to the control input of the multiplexer, and a disable signal output which is connected to the switch (S),
   the switching logic being adapted in such a way that it opens the switch (S) when the signal (CFG) at its control input changes, subsequently passes on the changed signal (CFG) from its control input to its control output, and closes the switch (S) again when the output signal (MUX_OUT) at the multiplexer output has changed at least once and is equal to the output signal (CLK_OUT) of the circuit.

2. A circuit as claimed in claim 1, characterized in that it comprises a clock generator (RO) which is coupled to the clock input of the switching logic (FSM) so as to make a logic clock signal (FCLK) available.

3. A circuit as claimed in claim 1, characterized in that the switching logic is a state machine (FSM) whose states and state transitions are implemented in such a way that it performs the following steps:
   a) waiting for a change of the clock selection signal (CFG) at the control input;
   b) supplying a disable signal (DISABLE) at the disable signal output for opening the switch (S) when the signal (CFG) at the control input has changed;
   c) passing on the signal (CFG) from the control input to the control output which leads to the multiplexer (MUX);
   d) waiting for a change of the signal at the multiplexer output (MUX_OUT);
   e) if the changed signal (MUX_OUT) at the multiplexer output is not equal to the output signal (CLK_OUT) of the circuit, waiting again for a change of the signal at the multiplexer output;
   f) eliminating the disable signal at the disable signal output so as to close the switch (S), and returning to step a).

4. A circuit as claimed in claim 1, characterized in that it is realized in CMOS.

* * * * *